No. 833,274. PATENTED OCT. 16, 1906.
H. J. WESTOVER.
APPARATUS FOR ANALYSIS OF GASES.
APPLICATION FILED APR. 4, 1906.

5 SHEETS—SHEET 1.

WITNESSES:
Kathryn B. Cheevers
James Loring

Henry J. Westover
INVENTOR

BY H. M. MacKaye
ATTORNEY

No. 833,274. PATENTED OCT. 16, 1906.
H. J. WESTOVER.
APPARATUS FOR ANALYSIS OF GASES.
APPLICATION FILED APR. 4, 1906.

5 SHEETS—SHEET 2.

WITNESSES:
Kathryn B. Cheevers
James Loring

Henry J. Westover
INVENTOR

BY H. S. MacKaye
ATTORNEY

No. 833,274. PATENTED OCT. 16, 1906.
H. J. WESTOVER.
APPARATUS FOR ANALYSIS OF GASES.
APPLICATION FILED APR. 4, 1906.

5 SHEETS—SHEET 4.

WITNESSES:

INVENTOR
Henry J. Westover

BY
ATTORNEY

No. 833,274. PATENTED OCT. 16, 1906.
H. J. WESTOVER.
APPARATUS FOR ANALYSIS OF GASES.
APPLICATION FILED APR. 4, 1906.

5 SHEETS—SHEET 5.

WITNESSES:

Henry J. Westover
INVENTOR

BY H. MacKaye
ATTORNEY

UNITED STATES PATENT OFFICE.

HENRY J. WESTOVER, OF MOUNT VERNON, NEW YORK.

APPARATUS FOR ANALYSIS OF GASES.

No. 833,274. Specification of Letters Patent. Patented Oct. 16, 1906.

Application filed April 4, 1906. Serial No. 309,948.

*To all whom it may concern:*

Be it known that I, HENRY J. WESTOVER, a citizen of the United States, residing in Mount Vernon, county of Westchester, State of New York, have invented a certain new and useful Improvement in Machines for Analysis of Gases, of which the following is a specification.

This invention has relation to a mechanical means whereby a practically continuous record is automatically produced showing the percentage of carbonic acid present in furnace-gases, so as to provide a permanent and reliable indication of the conditions of combustion for the guidance of engineers.

The invention is shown in a preferred embodiment in the accompanying drawings, wherein—

Figure 1:
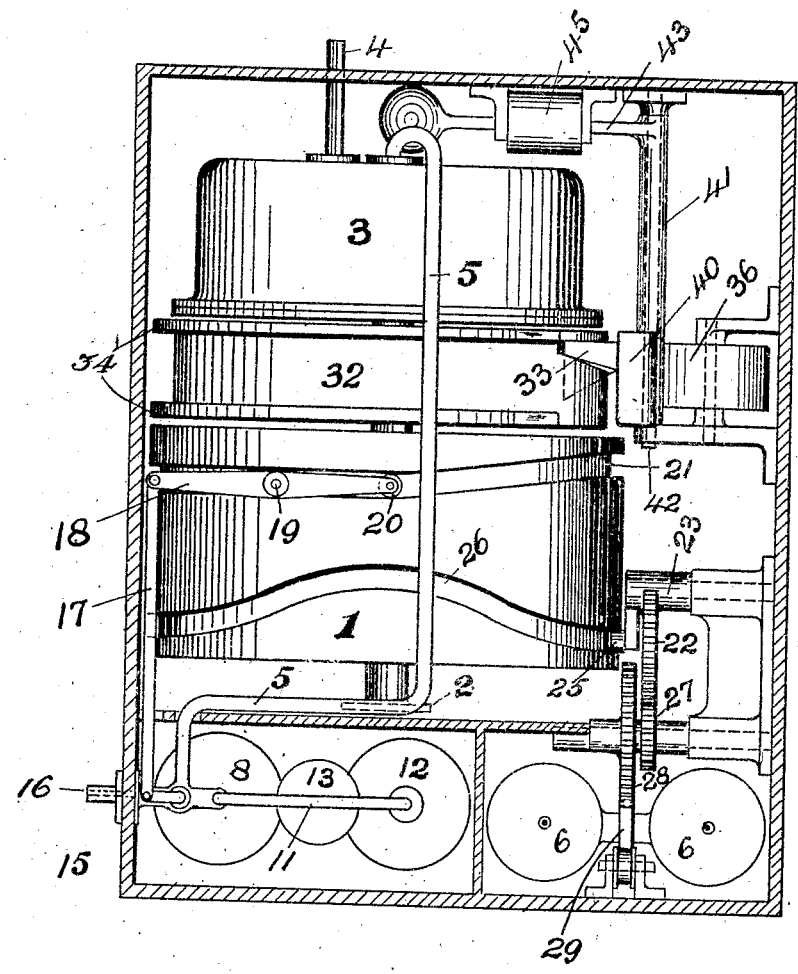
Figures 2, 4:
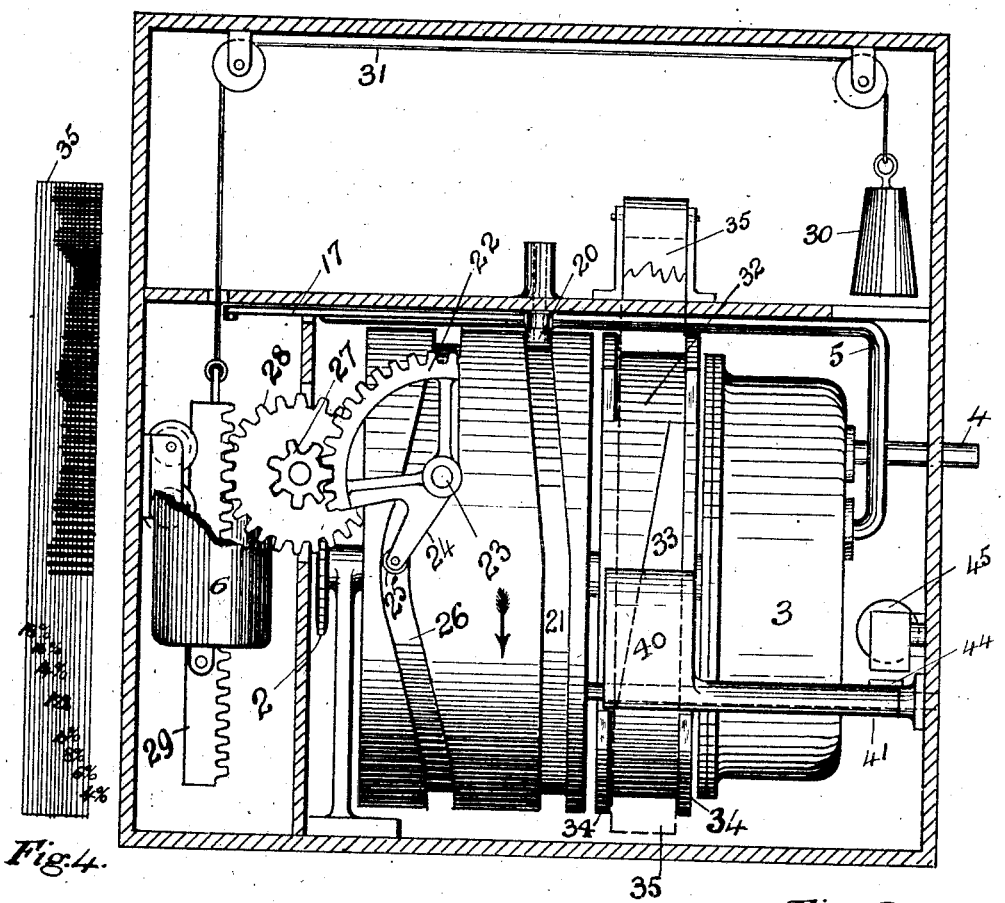
Figure 3:
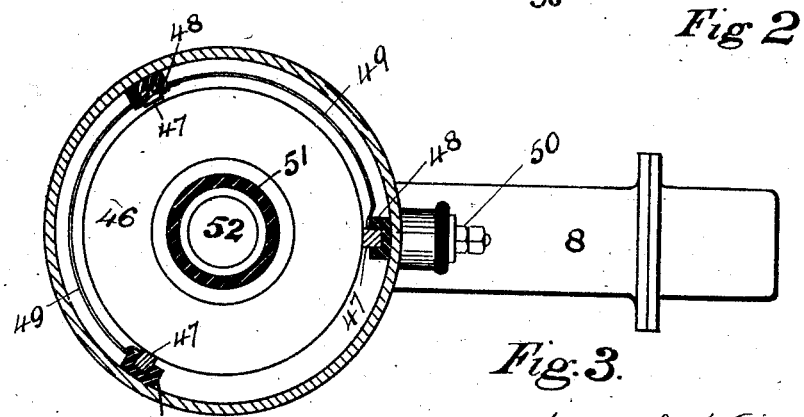
Figure 5:
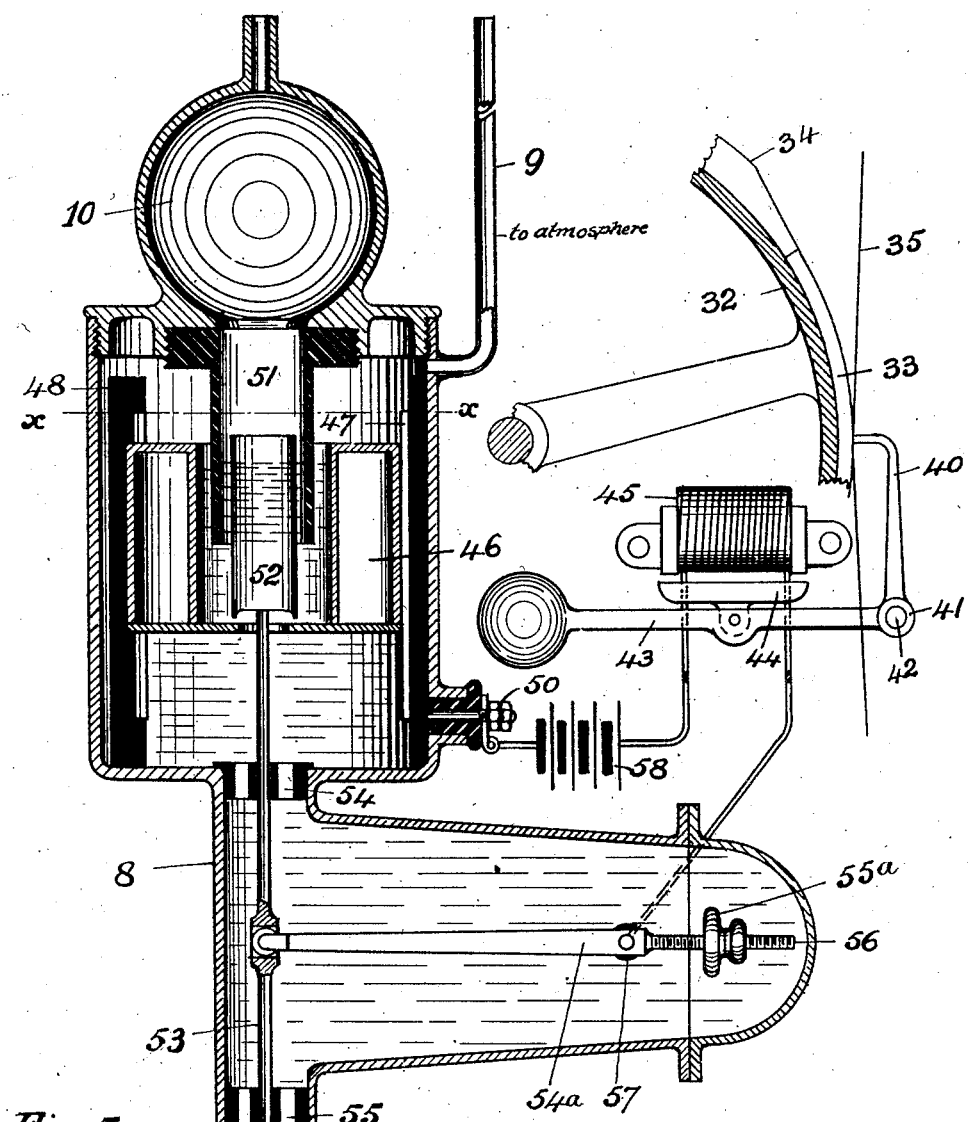
Figure 6:
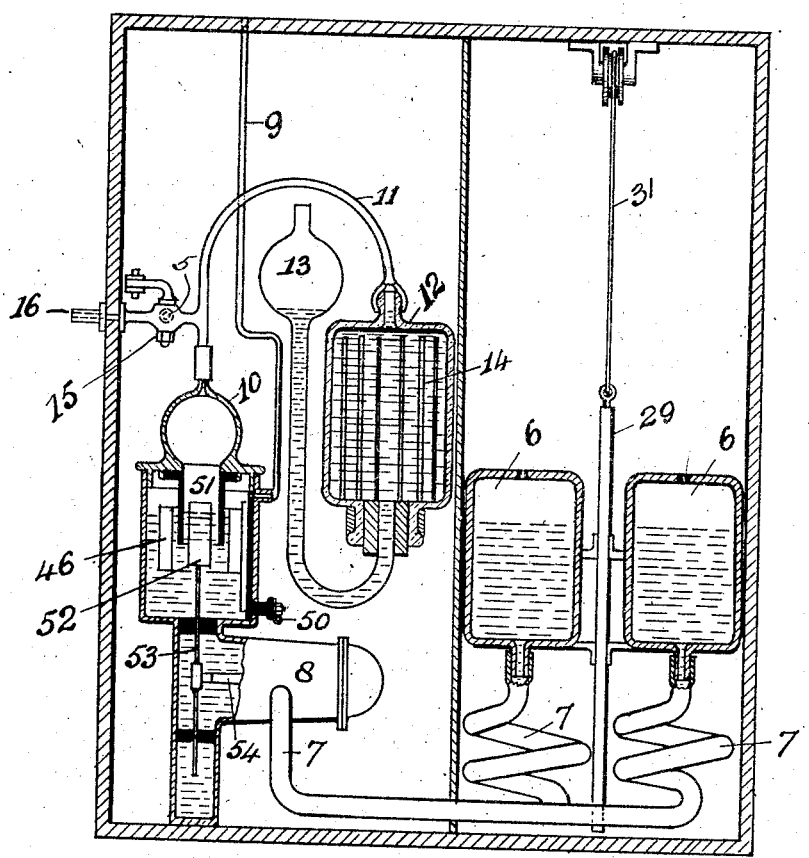

Figure 1 is a plan view with the top of the casing removed. Fig. 2 is a side view. Fig. 3 is a horizontal section on the plane x x in Fig. 5. Fig. 4 shows a portion of the record as made on the paper tape. Fig. 5 is a vertical section of the measuring-chamber, showing certain other parts in diagram. Fig. 6 is a diagrammatic elevation showing the movable reservoirs and associated parts, and Fig. 7 is a diagrammatic elevation showing the relation of the recording device to the revolving drum.

The various parts are operated in the proper order primarily by a main drum, (shown at 1) which may be driven by means of the sprocket-wheel 2 or otherwise, as desired. The furnace-gases to be analyzed are supplied in any desired manner to the reservoir 3, coming in by the pipe 4, and are transmitted from the reservoir to the measuring-chamber through the pipe 5.

The apparatus used for direct action upon the gases is best shown in Figs. 3, 5, and 6. This comprises one or more movable reservoirs 6, open to the atmosphere at the top and connected by flexible tubes 7 to the bottom of the measuring-chamber 8. The reservoirs 6, tubes 7, and chamber 8 are provided with a body of a suitable insulating liquid, such as oil or glycerin, which does not absorb carbonic acid or other ingredients of the gases to be analyzed and does not act as an electrical conductor. The upper end of the measuring-chamber 8 is connected to the atmosphere by the tube 9 or otherwise and is surmounted by a supplementary chamber 10, the top of which is connected by a tube of small caliber 11, the other end of which connects with the top of the absorption-chamber 12. This last-named chamber is in permanent connection with a displacement-chamber 13 and is further provided with glass rods 14 or other means for increasing the area of wet surface. The chambers 12 and 13 contain a body of liquid capable of absorbing carbonic acid—as, for instance, a solution of caustic potash. A three-way valve 15 serves to connect the top of the chamber 10 with the atmosphere at 16 or with the inlet-pipe 5, according to the position of the valve. (See Fig. 1.) The valve 15 is operated by rod 17, one end of which is pivoted to the operating-lever 18, which lever has its fulcrum at 19 and carries on its opposite end a roller 20, located in the appropriately-shaped groove 21 on the surface of the main drum 1. As the drum revolves the inclined sides of the groove 21 cause back-and-forth movement of the roller 20, whereby the valve 15 is operated at the proper time with respect to the movement of the other parts of the apparatus. The reservoir or reservoirs are raised or lowered at proper intervals by means of a toothed section 22, pivoted at 23 and rigidly connected to an arm 24, at the end of which is carried a roller 25, which works within the cam-groove 26 on the surface of the main drum. As the drum revolves in the direction of the arrow in Fig. 2 the inclined sides of the groove 26 cause a reciprocating movement of the sector 22, which is transmitted through the toothed wheels 27 and 28 to the rack 29, so that this rack is caused to move up and down, carrying with it the reservoir 6. The rack and reservoir are counterbalanced by the weight 30, connected thereto by a rope 31. There is mounted on the main shaft with the main drum 1 a recording-drum 32, which bears on its face a raised marking-surface 33, which is quite narrow at one end and grows gradually broader toward the opposite end, as shown in Figs. 1 and 2. At the opposite ends of the drum 32 there are provided resetting-flanges 34, which stand higher than the marking-surface 33, as shown in Fig. 5. The flanges 34 extend around the drum 32, but are cut away, as shown in Fig. 5, opposite the marking-surface 33 for purposes hereinafter explained. The record-ribbon 35 is wound on a roll 36 at the bottom of the apparatus and is carried up opposite the periphery of the recording-drum 32, as shown on Figs. 2, 5, and 7. The progressive movement of the ribbon 35 is accomplished by any desired mechanism, which is indicated by the wheels 37 in Fig. 7. Mechanism of this kind is well known in various arts and needs no further description here.

Figure 7:
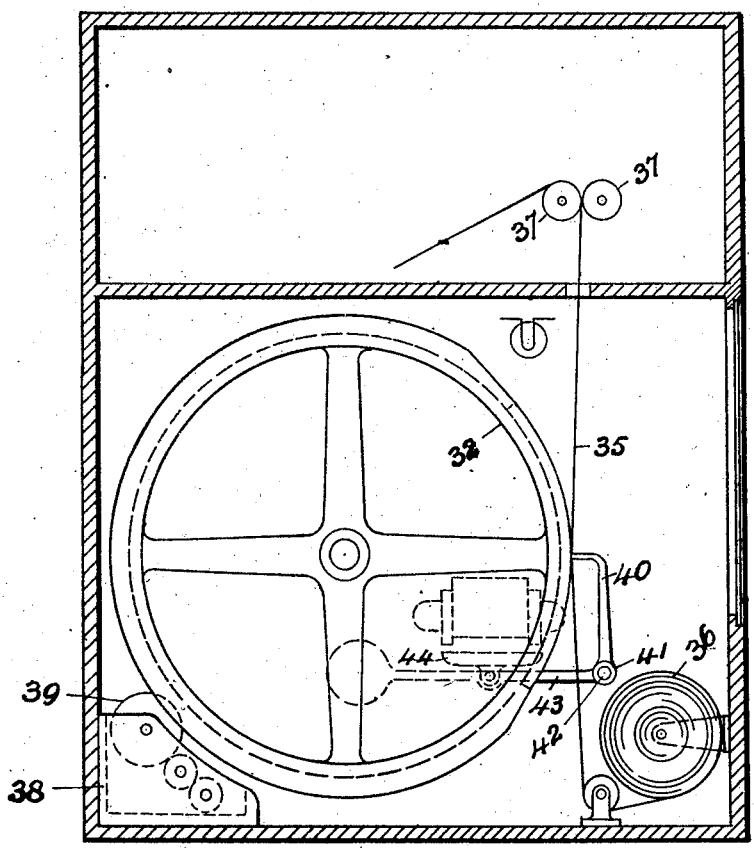

As shown in Fig. 7, an ink-reservoir 38, provided with appropriate inking-rolls 39, is provided opposite the recording-drum on the other side from the recording-ribbon 35. The roll 39 is so placed that it makes contact with the recording-surface 33 during a part of every revolution of the drum. The ribbon 35 moves between the surface of the drum on one side and a bent marking-finger 40 on the other side. The marking-finger 40 is fixed on the end of a sleeve 41, carried on a spindle 42; and on the opposite end of said sleeve is placed a weighted arm 43, the tendency of which is to press the tip of the finger 40 against the back of the ribbon 35, so as to press said ribbon against the marking-surface 33. An armature 44 is carried on the arm 43, and when this arm is raised the armature will hold it up as long as the magnet 45 is energized, as shown in Figs. 1 and 2. The edge of the finger 40 is long enough to overlap the sides of the ribbon 35 and to be pushed outward by the flanges 34 when these revolve into a position opposite said finger. Within the measuring-chamber 8 there is placed an annular metallic float 46, which slides vertically between metallic guides 47, said guides being supported by insulation 48, as shown in Figs. 3 and 5, and being connected electrically by the wire 49 or otherwise. The guides 47 are electrically connected with the insulated binding-post 50. The insulating-cylinder 51 depends from the top of the chamber 8, being surrounded by the float 46 and surrounding in turn a second metallic float 52, preferably cylindrical in form, as shown. The bottom edge of the cylinder 52 normally rests upon a portion of the float 46, and there is a guiding-rod 53 passing through insulating-guides 54 and 55 in the lower part of the chamber 8, which insures vertical movement of the float 52. A pivoted balancing-lever 54ª is provided with an adjustable weight 55ª, preferably turning on a threaded stem 56, whereby the position of the apparatus with regard to the time of separation of the floats 46 and 52, as herein described, is determined. The end pivot of the lever 54ª is insulated, as shown at 57 in Fig. 5, and the coils of the magnet 45 are connected on one side through the battery 58 to the binding-post 50 and on the other side to the insulated pivot 57, all as shown in Fig. 5.

The operation of the device is as follows: Supposing a record to have been made and the measuring-chamber to be partly filled with the gas, which has just been analyzed, the reservoirs 6, which are in their lowest position, are moved upward by the mechanism above described. At the same time the valve 15 shuts off access to the pipe 5 and opens the way to the atmosphere through 16. The insulating liquid in the measuring-chamber rises, driving the old gas out to the atmosphere through 9 and 16, and this continues until the liquid reaches the top of the chamber 10. As the chamber 12 is full during this operation the old gas is entirely driven out except for what is contained in the very small tube 11. This quantity is negligible. Further rotation of the drum 1 connects the tube 11 with the gas-inlet tube 5, and as soon as this is accomplished the reservoirs 6 descend and the level of the liquid falls into the measuring-chamber, so that the gases to be analyzed fill the empty space left in the measuring-chamber 8 and the supplementary chamber 10. In this position further rotation of the drum 1 closes the valve 15 altogether, and when this is accomplished the reservoirs 6 begin to rise again. The reservoirs 6 are now made to move upward as before, and as the liquid rises the float 46 is held firmly up against the bottom of the float 52, while the gas in the chamber 8 is driven out to the atmosphere. This continues until the top of the liquid reaches the bottom of the cylinder 51, after which a certain definite predetermined volume of gas at atmospheric pressure is imprisoned within the cylinder 51 and all the spaces above it and in connection with it. As the reservoirs continue to rise the liquid in the measuring-chamber finally forces all of the fresh gas over into the absorption-chamber 12, forcing the absorbing liquid out of said chamber into the displacement-chamber 13. Here the gas is separated by the action of the absorbent liquid and the $CO_2$ is removed. The reservoirs then move downward again and by this time the marking-surface 33 has come opposite the finger 40 at the widest part of said surface and said finger is no longer kept away from the marking surface by the flanges 34. The magnet 45, however, prevents the finger 40 from moving against the paper 45, because the circuit of said magnet is closed through the pivot 57, the lever 54ª, the rod 53, the two floats 52 and 46, which are in contact, the guides 47, the binding-post 50, and the battery 58. As the reservoirs 6 descend and the gas returns from the chamber 12 to the chamber 10 and cylinder 51 the two floats 52 and 46 will descend together as long as the pressure of the gas in the chamber 10 and cylinder 51 is greater than or equal to the atmospheric pressure to which the liquid is subjected outside of the cylinder 51. There will come a point, however, when the pressure will be less in the cylinder 51 than outside of it, and the liquid within the cylinder 51 will then fall less rapidly than the liquid outside of it. When this occurs, the float 46 will leave the float 52 and the circuit through the magnet 45 will be broken, allowing the lever 43 to fall and causing the tip of the finger 40 to press the ribbon 45 against the inked marking-surface 33. The larger the percentage of carbonic acid the sooner will the pressure in the cylinder 51 fall to the critical point, and as soon as the marking-surface 33 moves so that it makes a progressively-narrower contact with the ribbon 35 the percentage of carbonic acid will be indicated by the width of the marking-surface, as shown by the ink-line produced on the ribbon 35 when this latter is pressed against the surface 33 by the finger 40. This contact will continue until the finger 40 is reset by the action of the advancing flanges 34; but the width of the line shown on the record will be that width which is presented by the marking-surface at the first moment of contact, because the marking-surface progresses from wider to narrower. The movement of the record-ribbon must be very slow as compared with the movement of the cylinder, so that the resulting marks across the record are quite narrow. The total continuous record produced on the ribbon will have somewhat the appearance shown in Fig. 4 and will consist of a succession of parallel lines across the ribbon the length of which will correspond to the percentage of carbonic acid in the gas analyzed at the moment each line is impressed.

This invention is not limited to the use of paper-ribbon for receiving the record, as other record-receiving devices may be employed, and it is also not essential to this invention that the marking-surface should be carried on the periphery of a cylinder.

The measuring-chamber provided, as shown, with the interior cylinder 51 consists of an exterior and an interior division, and it is not essential to this invention that these divisions should be given the shape shown or that the interior chamber should be located as shown in the drawings.

While I prefer the use of one or more vertically-movable reservoirs for changing the level of the liquid in the measuring-chamber, any level-changing means will be within the invention. In my claims the expression "recording device" or "recording means" does not necessarily mean a device for producing a permanent record; but any means whereby the percentage of gas is made known will be within the invention, and the electrical device for making known the percentage of gas need not necessarily include electromagnetic means, although these are preferred.

This invention applies to gas-analyzing apparatus for any purpose and is not to be limited to the use of said apparatus in connection with furnaces.

What I claim is—

1. A gas-analyzing apparatus comprising a measuring-chamber, a body of liquid therein, means for varying the level of said liquid in said chamber, an electrically-operated recording device, an electric circuit for said device and means operated by movement of said liquid in said measuring-chamber for controlling said circuit, substantially as described.

2. A gas-analyzing apparatus comprising a measuring-chamber having an exterior division and an interior division, a body of liquid in said chamber, means for varying the level of said liquid in said chamber, an electrically-operated recording device, an electric circuit for said device and means operated by differences of pressure in the two divisions of said measuring-chamber, for controlling said circuit, substantially as described.

3. A gas-analyzing apparatus comprising a measuring-chamber having an exterior and an interior division, an absorption-chamber in communication with said interior division, a body of liquid in said measuring-chamber, means for varying the level of the liquid in said chamber, an electrically-operated recording device, an electric circuit for said device and means operated by differences of pressures in said two divisions of the measuring-chamber for controlling said circuit, substantially as described.

4. A gas-analyzing apparatus comprising a measuring-chamber having an exterior and an interior division, a body of liquid in said chamber, means for varying the level of said liquid, an electrically-operated recording device, an electric circuit for said device and two floats in said circuit moving respectively in said two divisions of said measuring-chamber, substantially as described.

5. A gas-analyzing apparatus comprising a measuring-chamber having an exterior and an interior division, a body of liquid in said chamber, a float surrounding the interior division, a second float making normal contact with said first float and adapted to enter said interior division, an electrical recording device and a circuit therefor including the portions of said two floats which make normal contact with each other, substantially as described.

6. A gas-analyzing apparatus comprising an absorption-chamber, a measuring-chamber having an exterior division communicating with the atmosphere and an interior division communicating with said absorption-chamber, a float surrounding said interior division, a second float normally in contact with said first float and capable of entering said interior division and a body of liquid within said measuring-chamber supporting said floats, substantially as described.

7. In a gas-analyzing apparatus, a measuring-chamber having an interior division and an exterior division, an outer metallic float, insulated metallic guides therefor, an inner metallic float within said interior division normally making contact with said outer float and insulated balancing means for said inner float, substantially as described.

8. In a gas-analyzing apparatus, a circuit-controller comprising an annular metallic float, a second metallic float surrounded by said annular float, a stem depending from said second float and balancing means applied to said stem, substantially as described.

9. In a gas-analyzing apparatus, a circuit-controller comprising an inner metallic float, a second annular float surrounding the same, a stem on said inner float, a pivoted balancing-lever having one end engaging said stem and a movable adjusting-weight on the other end of said lever, substantially as described.

10. In a gas-analyzing apparatus, a measuring-chamber having a central cylindrical interior division, an inner metallic float within said interior division, an annular metallic float normally making contact with said inner float and surrounding said interior division, insulated conducting-guides for said annular float, an insulating liquid for supporting said floats and an electric circuit through said guides and floats, substantially as described.

11. A gas-analyzing apparatus, comprising a measuring-chamber, an absorption-chamber, a gas-supply pipe, a valve controlling communication between said pipe and chambers, a rotating cam-cylinder and connections between said cam-cylinder and valve for operating the latter, substantially as described.

12. A gas-analyzing apparatus comprising a measuring-chamber, an absorption-chamber, a body of liquid in the former chamber, means for changing the level of said liquid, a gas-supply pipe, a valve controlling communication between said pipe and said chambers, a rotating cylinder bearing two cams, operating connections between said cylinder and said valve and operating connections between said cylinder and said liquid-moving means, substantially as described.

13. A gas-analyzing apparatus comprising a vertically-movable reservoir, a rotating cam-cylinder, a pivoted toothed sector having an arm engaging with the cam on said cylinder and gearing connecting said sector with said reservoir for causing vertical movement of the latter, substantially as described.

14. A gas-analyzing apparatus comprising a record-cylinder and a cam-cylinder adapted to rotate together, a device for displacing gas, means for connecting said cam-cylinder with said device for operating the latter, a valve for determining the direction of movement of said gas and means connecting said cam-cylinder with said valve for operating the latter, substantially as described.

15. A gas-analyzing apparatus comprising a record-cylinder having a tapering marking-surface, in combination with a record-receiving device and means for bringing said device into temporary contact with said marking-surface, substantially as described.

16. A gas-analyzing apparatus comprising a movable tapering marking-surface, a record-receiving device and means for bringing said surface and said device into temporary contact, substantially as described.

17. A gas-analyzing apparatus comprising a movable tapering marking-surface, a pivoted marking-finger and a record-ribbon between said finger and said marking-surface, substantially as described.

18. A gas-analyzing apparatus comprising a movable tapering marking-surface, a movable marking-finger, a record-ribbon between said finger and said surface and an electromagnet controlling said finger, substantially as described.

19. A gas-analyzing apparatus comprising a rotary cylinder carrying a tapering marking-surface on its periphery and having a flange higher than said surface and cut away opposite said surface, a marking-finger extending across said marking-surface and flange and a record-ribbon between said finger and said marking-surface, substantially as described.

20. A gas-analyzing apparatus comprising a measuring-chamber, a body of liquid within the same, an electric circuit, means operated by movement of said liquid for controlling said circuit, an electromagnet in said circuit, a movable tapering marking-surface, a record-receiving device and means controlled by said magnet for causing contact between said record-receiving device and said marking-surface, substantially as described.

21. A gas-analyzing apparatus comprising a drum carrying a marking-surface, means for rotating the same, gas-measuring apparatus, means for admitting gas to said measuring apparatus, mechanical connections between said drum and said measuring means and gas-admitting means for operating these latter in appropriate sequence, recording means adapted to coöperate with said marking-surface on the drum and electrical means controlled by said gas-measuring means for operating said recording means, substantially as described.

22. A gas-analyzing apparatus comprising a recording device, electrical means for operating said device, an absorbing-chamber, an absorbing liquid therein and a circuit-controlling device for operating said electrical means governed as to operation by the position of said liquid in the absorbing-chamber, substantially as described.

HENRY J. WESTOVER.

Witnesses:
H. S. MacKaye,
Kathryn B. Cheevers